(12) United States Patent
Qi et al.

(10) Patent No.: US 12,225,556 B2
(45) Date of Patent: Feb. 11, 2025

(54) ADAPTIVE DATA RADIO BEARER MAPPING FOR MULTICAST/BROADCAST IN WIRELESS NETWORKS

(71) Applicant: ZTE Corporation, Guangdong (CN)

(72) Inventors: Tao Qi, Guangdong (CN); Feng Xie, Guangdong (CN); Yan Xue, Guangdong (CN); Shuqiang Xia, Guangdong (CN); Kun Cao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 391 days.

(21) Appl. No.: 17/732,206

(22) Filed: Apr. 28, 2022

(65) Prior Publication Data

US 2022/0256505 A1  Aug. 11, 2022

Related U.S. Application Data

(63) Continuation of application No. PCT/CN2019/114627, filed on Oct. 31, 2019.

(51) Int. Cl.
*H04W 72/12* (2023.01)
*H04L 12/18* (2006.01)
*H04W 28/02* (2009.01)
*H04W 72/30* (2023.01)
*H04W 72/542* (2023.01)

(52) U.S. Cl.
CPC ........... *H04W 72/30* (2023.01); *H04L 12/189* (2013.01); *H04W 72/542* (2023.01)

(58) Field of Classification Search
None
See application file for complete search history.

(56) References Cited

U.S. PATENT DOCUMENTS

| | | |
|---|---|---|
| 2006/0034205 A1 | 2/2006 | Kim |
| 2008/0293428 A1 | 11/2008 | Rey et al. |
| 2013/0170357 A1 | 7/2013 | Anchan et al. |
| 2015/0009821 A1 | 1/2015 | Sridhar et al. |

(Continued)

FOREIGN PATENT DOCUMENTS

| | | |
|---|---|---|
| CN | 101374060 | 2/2009 |
| CN | 101374060 A | 2/2009 |

(Continued)

OTHER PUBLICATIONS

Chinese Office Action issued Feb. 14, 2023 in corresponding Chinese Application No. 201980101636.6.

(Continued)

*Primary Examiner* — Sai Aung
(74) *Attorney, Agent, or Firm* — Crowell & Moring LLP (57) ABSTRACT

This disclosure relates to mechanisms for allocating and mapping wireless communication resources for a multicast/broadcast session in a wireless network. In some exemplary implementations, data flows in a multicast/broadcast session may be duplicated and adaptively and dynamically mapped to multiple independent radio bearers, where each of these multiple independent radio beaters may be configured to either multicast the multicast/broadcast data to a group of target user equipments or unicast the multicast/broadcast data to a single user equipment.

20 Claims, 5 Drawing Sheets

(56) References Cited

U.S. PATENT DOCUMENTS

| | | | |
|---|---|---|---|
| 2016/0381695 A1* | 12/2016 | Zhang | H04W 76/11 370/329 |
| 2017/0374581 A1 | 12/2017 | Dao | |
| 2018/0205808 A1* | 7/2018 | Yang | H04L 45/00 |
| 2018/0367288 A1* | 12/2018 | Vrzic | H04W 76/12 |
| 2018/0368167 A1* | 12/2018 | Kim | H04W 28/0278 |
| 2019/0028920 A1 | 1/2019 | Pan | |
| 2019/0149421 A1* | 5/2019 | Jin | H04W 36/0077 370/331 |
| 2020/0021530 A1* | 1/2020 | Jiang | H04L 47/24 |
| 2022/0322469 A1* | 10/2022 | Yang | H04W 76/12 |

FOREIGN PATENT DOCUMENTS

| | | |
|---|---|---|
| CN | 109286999 | 1/2019 |
| CN | 109417733 | 3/2019 |
| WO | WO 2004/043107 | 5/2004 |
| WO | WO 2005/125095 A1 | 12/2005 |
| WO | WO 2007/024082 A1 | 3/2007 |
| WO | WO 2016/127910 | 8/2016 |

OTHER PUBLICATIONS

Australian Office Action issued Mar. 9, 2023 in corresponding Australian Application No. 2019471690.

Extended European Search Report issued Sep. 27, 2023 in corresponding European Patent Application No. 19950668.4.

Supplementary European Search Report issued Jun. 26, 2023 in corresponding European Patent Application No. 19950668.4.

Motorola Solutions; "Multicast requirements, MCPTT usage of MBMS"; 3GPP TSG-SA WG6 Meeting #5 S6-150626; Seoul, Korea, Jul. 10, 2015; 22 pages.

International Search Report mailed Aug. 5, 2020 for International Application No. PCT/CN2019/114627.

Written Opinion mailed Aug. 5, 2020 for International Application No. PCT/CN2019/114627.

* cited by examiner

ADAPTIVE DATA RADIO BEARER MAPPING FOR MULTICAST/BROADCAST IN WIRELESS NETWORKS

CROSS REFERENCE

This application is a continuation of and claims priority to International Patent Application No. PCT/CN2019/114627, filed Oct. 31, 2019, which is herein incorporated by reference in its entirety.

TECHNICAL FIELD

This disclosure is generally directed to wireless communication resource allocation/mapping and is particularly directed to adaptive mapping of multicast/broadcast data flows to multiple unicast or multicast/broadcast data radio bearers.

BACKGROUND

A wireless communication session in a wireless communication network may carry data traffic between a specific user equipment and a specific network destination in a core network. A wireless communication session may alternatively carry broadcast or multicast service data from a wireless carrier network to a plurality of user equipments. Such a wireless communication session may be established for transmitting and/or receiving data with a multitude of quality of service (QoS) requirements. Data traffic in a wireless communication session may thus be internally divided into various data flows of different QoS, or different QoS flows. A QoS flow may be allocated and mapped to one or more radio communication resources for carrying data loads associated with the QoS flow via an air interface.

SUMMARY

This disclosure relates to methods, systems, and devices for allocating wireless communication resources for transmitting and receiving Multicast/broadcast service data.

In one implementation, a method for radio bearer mapping in a wireless network is disclosed. The method may include determining, by a data transmission network node, one or more data transmission flows having predefined Quality of Service (QoS) profiles containing multicast/broadcast service data to a plurality of user equipments; mapping, by the data transmission network node, the one or more data transmission flows to a first radio bearer for transmitting the multicast/broadcast service data to a first set of user equipments among the plurality of user equipments; mapping, by the data transmission network node, the one or more data transmission flows to a second radio bearer independent of the first radio bearer for transmitting the multicast/broadcast service data to a second set of user equipments among the plurality of user equipments; and configuring the data transmission network node to transmit the multicast/broadcast service data independently via the at least the first radio bearers and the second radio bearer each carrying the one or more data transmission flows.

In another implementation, a method for mapping radio bearers in a wireless network is disclosed. The method may include determining one or more data transmission flows having predefined Quality of Service (QoS) profiles containing multicast/broadcast service data to a plurality of user equipments serviced by a data transmission network node; determining currently allocable air interface communication resources; when the currently allocable air interface communication resources is below a threshold value, allocating a single radio bearer for multicast/broadcast of the multicast/broadcast service data to the plurality of user equipments. The method may further include, when the currently allocable air interface communication resource relative to a number of user equipments serviced by the wireless network node is above a threshold value, allocating at least two independent radio bearers correspondingly to at least two sets of user equipments for respectively unicasting or multicasting/broadcasting the multicast/broadcast service data to the at least two sets of user equipments. The method may further include configuring the data transmission network node to transmit the multicast/broadcast service data independently via the at least two independent radio bearers each containing the one or more data transmission flows.

In another implementation, a method performed by a user equipment is disclosed. The method may include receiving a first resource allocation from a data transmission network node containing an operation of addition/release/modification of a unicast radio bearer wherein the unicast radio bearer is allocated to the user equipment and is not shared by other user equipments; receiving a second resource allocation from the data transmission network node containing an operation of addition/release/modification of a multicast/broadcast radio bearer; configuring the unicast radio bearer and the multicast/broadcast radio bearer in the user equipment according to the first resource allocation and the second resource allocation; and requesting one or more lower layers to receive multicast/broadcast service data from the data transmission network node targeting a plurality of user equipments via the unicast radio bearer or the multicast/broadcast bearer or both.

In some other implementations, one or more network devices comprising one or more processors and one or more memories are disclosed. The one or more processors may be configured to read computer code from the one or more memories to implement a method in any one of the implementations above.

In some other implementations, a wireless user equipment comprising one or more processors and one or more memories are disclosed. The one or more processors may be configured to read computer code from the one or more memories to implement a method in any one of the implementations above.

In some other implementations, a computer program product comprising a non-transitory computer-readable program medium with computer code stored thereupon is disclosed. The computer code, when executed by one or more processors, may cause the one or more processors to perform of any one of the implementations above.

The above embodiments and other aspects and alternatives of their implementations are explained in greater detail in the drawings, the descriptions, and the claims below.

DETAILED DESCRIPTION

A wireless communication network may include user equipments (UEs) and a carrier network. The carrier network, for example, may further include wireless access networks and a core network. The wireless access networks may include wireless base stations or wireless access network nodes that are backhauled to the core network. The UEs may connect to the carrier network via the wireless access network nodes using air interface. The UEs may include both mobile and fixed network devices. The carrier network may be configured to transmit and route voice, data, and other information among UEs, and between the UEs and other data networks or other carrier networks terminated at the input edges of the core network.

A communication session through the carrier network may be established among the UEs and between the UEs and the other data networks. Such a communication session may be broadly referred to as a protocol data unit (PDU) communication session or a PDU session. A PDU session may be established for transmitting/receiving and routing different types of data with a multitude of quality of service (QoS) requirements. As such, a PDU session may include various data flows or data pipes of different QoS. These data flows or data pipes may be referred to as QoS flows. The QoS flows may be assigned and mapped to wireless communication resources. The wireless communication resources, for example, may include data radio bearers for carrying wireless data between UEs and wireless access network nodes. The data radio bearers may be further implemented in the transport layers as occupying some physical radio resource blocks and time slots. A data radio bearer may be allocated and assigned to carry one or more QoS flows.

Figure 1:
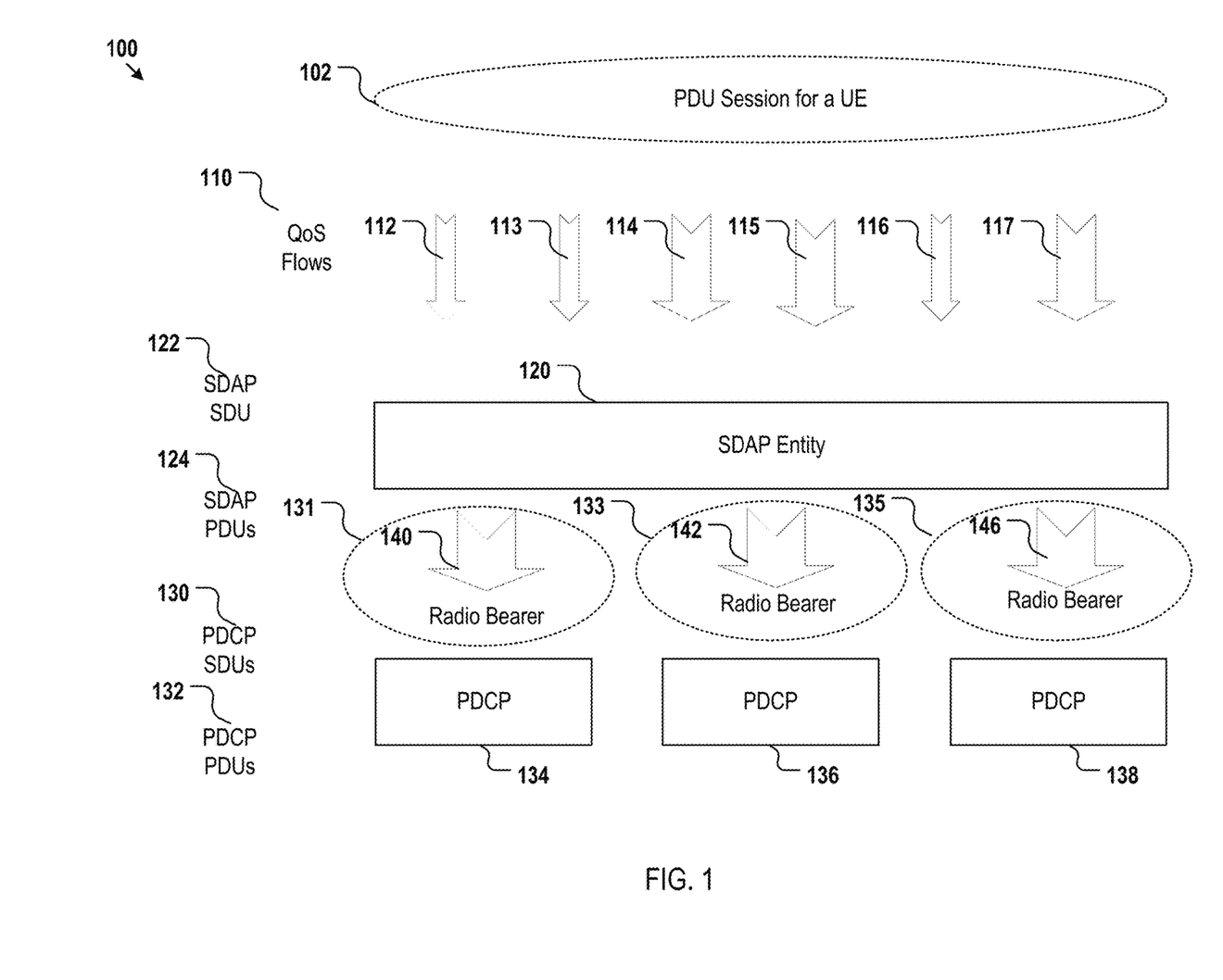
FIG. 1 shows an exemplary implementation for mapping QoS flows in a protocol data unit (PDU) session in a wireless network to independent data radio bearers.

FIG. 1 illustrates an exemplary implementation 100 for data radio bearer allocation and assignment for a PDU session 102 associated with a particular UE. As shown in FIG. 1, the PDU session 102 may encapsulate multiple QoS flows 110 including exemplary QoS flows labeled as 112-117. Each of the QoS flows is associated with a specific set of QoS requirements. The QoS requirements for a particular QoS flow may be specified in a QoS profile. A QoS profile, for example, may identify QoS characteristics such as allocation and retention priority parameters, and various bit rates such as a guaranteed flow bit rate (GFBR), a maximum flow bit rate (MFBR), and an aggregate maximum bit rate (AMBR). In FIG. 1, variations of the arrows 112-117 in width are illustrated to indicate QoS flows with disparate characteristics. Arrows with similar width represent similar characteristics. For example, QoS flows 112, 113, and 116 are indicated as having similar characteristics. Likewise, QoS flows 114, 115, and 117 are indicated as having similar characteristics which are different from those of QoS flows 112, 113, and 116.

The implementation 100 of FIG. 1 further shows several function blocks that are involved in the allocation and mapping of data radio bearers for the QoS flows 110 within the PDU session 102. These function blocks may be implemented as part of the wireless communication protocol stack. In the implementation of FIG. 1, the QoS flows 110 within the PDU session 102 may be mapped by a service data adaptation protocol (SDAP) entity 120 to radio data bearers allocable to the PDU session. A data radio bearer may be alternatively referred to as a radio bearer. One data radio bearer may be assigned to one or more QoS flows. For example, as shown in FIG. 1, QoS flows 112, 113, and 116 (aggregated and processed by the SDAP entity 120 as 140) may be collectively mapped to data radio bearer 131, and the single QoS flow 114 (processed by the SDAP entity 120 as 142) may be mapped to data radio bearer 133, whereas QoS flows 115 and 117 (aggregated and processed by the SDAP entity 120 as 146) may be collectively mapped to data radio bearer 135. The particular mapping between QoS flows 110 and the various data radio bearers above is merely one of many examples. The mapping of QoS flows 110 to data radio bearers 131, 133, and 135 may be determined by the transmission network node dynamically and adaptively according to the characteristics of the corresponding QoS flows and configurations from the network. For example, QoS flows with like characteristics may be mapped collectively to a common radio bearer, as described in the example above.

In particular, the SDAP entity 120 takes an output from an upper protocol stack layer as an input. Such an input may be referred to as SDAP service data unit (SDU) 122. The SDAP SDU 122, as shown in FIG. 1, may include the QoS flows 110. The SDAP entity 120 performs the mapping of the QoS flows 110 to the data radio bearers, and may add various data items to encapsulate the input SDAP SDU 122 to generate one or more outputs, labeled as SDAP PDUs 124. In some implementations, the SDAP entity may add QoS flow identifiers (QFIs) to the SDAP SDU 122 in forming the SDAP PDUs 124.

As further shown in FIG. 1, the QoS flows mapped to a particular data radio bearer may then be processed and handled by a packet data convergence protocol (PDCP) entity. Each of the data radio bearers may be associated with a PDCP entity. For example, aggregated QoS flow 140 (including QoS flows 112, 113 and 116 in the example above) associated with radio bearer 131 may be handled by PDCP entity 134, the processed QoS flow 142 associated with radio bearer 133 may be handled by PDCP entity 136, whereas the aggregated QoS flow 144 (including QoS flows 115 and 117) associated with radio bearer 135 may be handled by PDCP entity 138. Specifically, the PDCP entities 134, 136 and 138 may independently process the outputs SDAP PDUs 124 from the SDAP entity 120 (alternatively referred to as inputs PDCP SDUs 130 for the PDCP entities) according the data radio bearer mapping to independently generated outputs PDCP PDUs 132.

Other layers in the wireless communication protocol stack are omitted from FIG. 1. For example, the PDCP layer may be followed by a sequence of radio link control (RLC) layer, a MAC layer, and then a physical layer. Each of the independent PDCP entities 134, 136, and 138, in particular, may be configured to provide services to an RLC entity in the RLC layer and other user plane layers. For example, the PDCP entities may facilitate transferring of user plane and control plane data, header compression, ciphering, data integrity protection, error correction, and automatic repeat request (ARQ).

Besides the PDU sessions involving particular UEs, other communication sessions may be established in the wireless communication system. For example, multicast/broadcast services may be offered via the carrier network to target a plurality of UEs rather than a single UE. Example of multicast/broadcast services include but are not limited to safety information dissemination in V2X and multicast/broadcast services in industrial Internet. These multicast/broadcast services may be associated with various transmission requirements. It is thus critical to provide reliable reception of these multicast/broadcast services by the UEs with efficient use of wireless communication resources. A multicast/broadcast service may be provided via a multicast/broadcast communication session, or a multicast/broadcast session. Like a PDU session, a multicast/broadcast session may include one or more QoS flows which are of various QoS characteristics or profiles.

FIG. 1 (and other Figures described below) may be applicable to a multicast/broadcast service data transmission side. For example, FIG. 1 (and the other Figures described below) may be applied to a network node in the carrier network when the multicast/broadcast service data is transmitted from the carrier network side. For another example, FIG. 1 (and other figures described below) may be applicable to a user equipment when the user equipment transmits multicast/broadcast service data. The carrier network node and the user equipment may be generally referred as a network node, a network device, a transmission network node, or data transmission network node.

Figure 2:
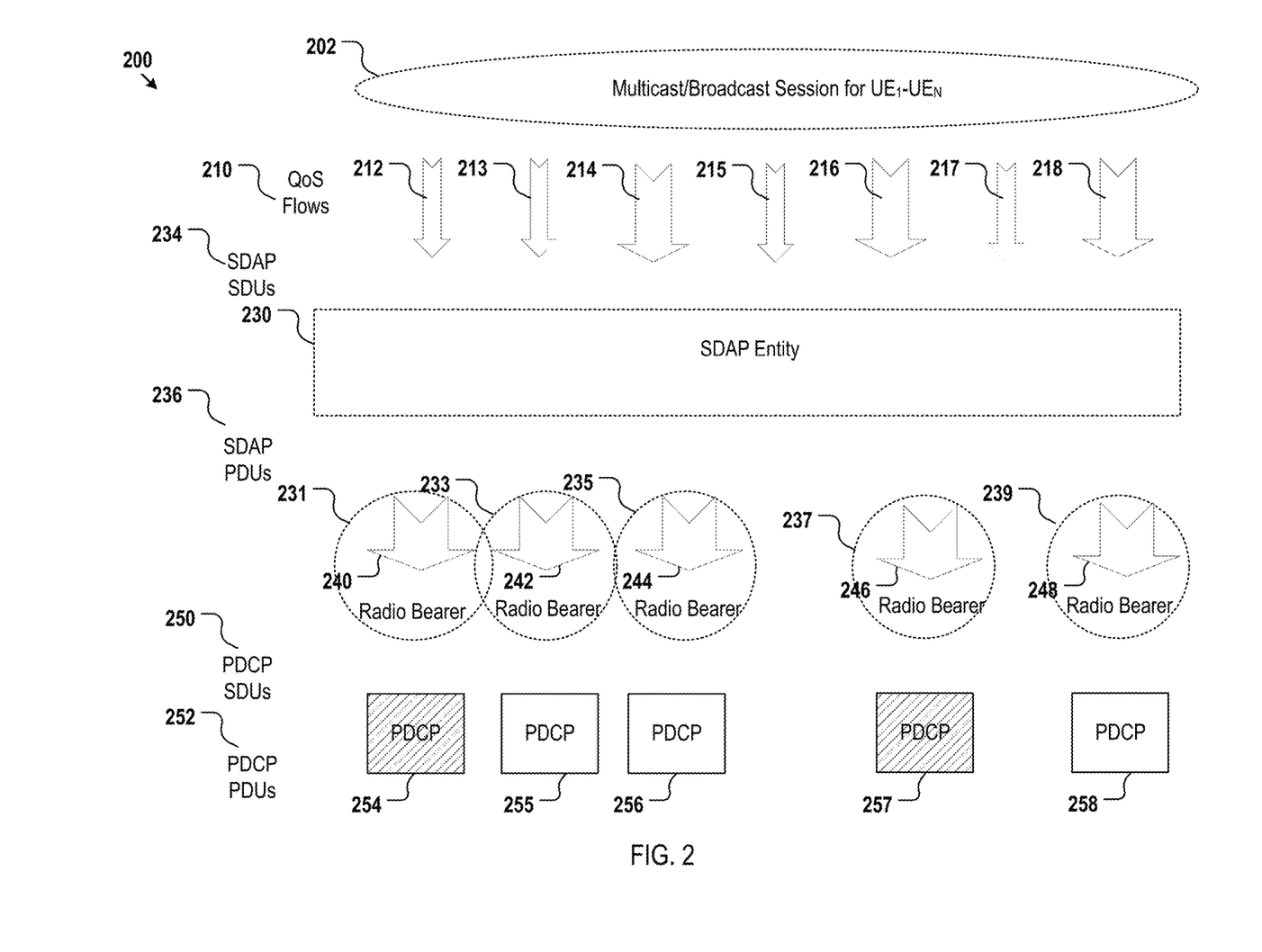
FIG. 2 shows an exemplary implementation for mapping QoS flows in a multicast/broadcast session in a wireless network to independent data radio bearers.

FIG. 2 illustrates an exemplary implementation 200 for mapping QoS flows in a multicast/broadcast session to independent data radio bearers. As shown in FIG. 2 and the description below for some implementations, a particular QoS flow may be mapped by a SDAP entity to multiple independent radio bearers and handled by corresponding independent PDCPs for either multicast/broadcast to a plurality of UEs or unicast to individual UEs. As such, multiple radio bearers may be adaptively and dynamically allocated and assigned by the network node to carry a same QoS flow depending on the characteristics of the multicast/broadcast service, the QoS requirements, and characteristics of the target UEs. A particular allocated and assigned bearer may be of either multicast/broadcast type or unicast type. Each bearer may carry one or more QoS flows of the multicast/broadcast session.

As specifically shown in FIG. 2, the multicast/broadcast session 202 may target a plurality of user equipment such as $UE_1$-$UE_N$. The multicast/broadcast session 202 may include multiple data pipes or QoS flows 210, including QoS flows 212-218, each associated with its QoS profile. In FIG. 2, variations of the arrows 112-117 in width are illustrated to indicate QoS flows with distinct characteristics or profiles. Arrows with similar widths indicate similar QoS flow characteristics. For example, QoS flows 212, 213, 215, and 217 are indicated as having similar characteristics. Likewise, QoS flows 214, 216, and 218 are indicated as having similar characteristics which may be distinct from those of QoS flows 212, 213, 215, and 217.

The implementation 200 of FIG. 2 further shows several function blocks that are involved in the allocation and mapping of the QoS flows 210 to data radio bearers within the multicast/broadcast session 202. In the implementation of FIG. 2, the QoS flows 210 within the multicast/broadcast session 202 may be mapped by the SDAP entity 230 to independent data radio bearers 231, 233, 235, 237, and 239. In some implementations, the QoS flows 210 may be mapped by the SDAP entity 230 to the data radio bearers by groups of QoS flows with each QoS flow group containing QoS flows that are similar in QoS characteristics. In the example of FIG. 2, the QoS flows 210 may be mapped by the SDAP entity 230 as two QoS flow groups with distinct characteristics. The first group of QoS flows of like characteristics may include QoS flows 212, 213, 215, and 217 (the QoS flow arrows in FIG. 2 with narrower widths). The second group of QoS flows of like characteristics may include QoS flows 214, 216, and 218 (the QoS flow arrows in FIG. 2 with larger widths). In the example implementation of FIG. 2, the first group of QoS flows may be collectively mapped to data radio bearers 231, 233, and 235, as shown by 240, 242, and 244 (each representing a duplicate of the first group of QoS flows), whereas the second group of QoS flows may be collectively mapped to data radio bearers 237 and 239, as shown by 246 and 248 (each representing a duplicate of the second group of QoS flows). In other words, each of the QoS flow group may be duplicatively carried by independent data radio bearers and each data radio bearer carries an entire QoS group. In the specific example of FIG. 2, the first group of QoS flows (QoS flows 212, 213, 215, and 217) are all carried by each of the radio bearers 231, 233, and 235, whereas the second group of QoS flows (QoS flows 214, 216, and 218) are all carried by each of the radio bearers 237 and 239.

The SDAP entity 230 may be configured to perform the mapping of the QoS flows 210 to the independent data radio bearers 231, 233, 235, 237, and 239 as described above. For example, the SDAP entity 230 may process outputs from a previous protocol stack layer as an input. Such inputs may be referred to as SDAP SDU 234 and may include the input QoS flows 212-218. The SDAP entity 230 performs necessary grouping, duplication, and data encapsulation of the input QoS flows 212-218, and mapping of each of the QoS groups to independent data radio bearers as described above. The SDAP 230 thus generate output 236, labeled as SDAP PDUs in FIG. 2. In some implementations, the SDAP entity 230 may add QFIs to the SDAP SDUs 234 in forming the SDAP PDUs 236. The SDAP PDUs 236 may include independent data radio bearers 231, 233, 235, 237, and 239.

As further shown in FIG. 2, the independent radio bearers 231, 233, 235, 237, and 239 may each be handled and processed by one independent PDCP entity. In particular, the data radio bearers 231, 233, 235, 237, and 239 may be handled and processed by independent PDCP entities 254, 255, 256, 257, and 258, respectively. Specifically, the PDCP entities 254, 255, 256, 257, and 258 may process the outputs SDAP PDUs 236 from the SDAP entity 230 (alternatively referred to as PDCP SDU inputs 250 for the PDCP entities) to independently generate PDCP outputs labeled as PDCP PDUs 252.

Other layers in the wireless communication protocol stack are omitted from FIG. 2. For another example, the PDCP layer may be followed by a sequence of radio link control (RLC) layer, a MAC layer, and then a physical layer. Each of the PDCP entities 254, 255, 256, 257, and 258, in particular, may be configured to provide services to an RLC entity in the RLC layer and other user plane layers. For example, the PDCP entities may facilitate transferring of user plane and control plane data, header compression, ciphering, and data integrity protection.

Continuing with FIG. 2, each of the data radio bearers 231, 233, 235, 237, and 239 may be configured for either multicasting/broadcasting the service data in the QoS flows embedded therein to a set of UEs among $UE_1$-$UE_N$ or unicasting the service data in the QoS flows embedded therein to a single UE among $UE_1$-$UE_N$. Correspondingly, each of the PDCP entities 254, 255, 256, 257, and 258 may be configured to handle either multicast/broadcast or unicast of the service data. As an example, the shaded PDCP entities 254 and 257 in FIG. 2 may be configured to handle multicast/broadcast of the service data to a plurality of UEs among $UE_1$-$UE_N$ and each of the unshaded PDCP entities 255, 256, and 258 may be configured to handle unicast of the service data to a single UE among $UE_1$-$UE_N$. In the implementation of FIG. 2, the PDCP 254, 255, and 256 handle the same first group of QoS flows of service data independently to target different UEs either by multicast or unicast. Likewise, the PDCP 257 and 258 handles the same second group of QoS flows of service data independently to target different UEs either by multicast or unicast.

Figure 3:
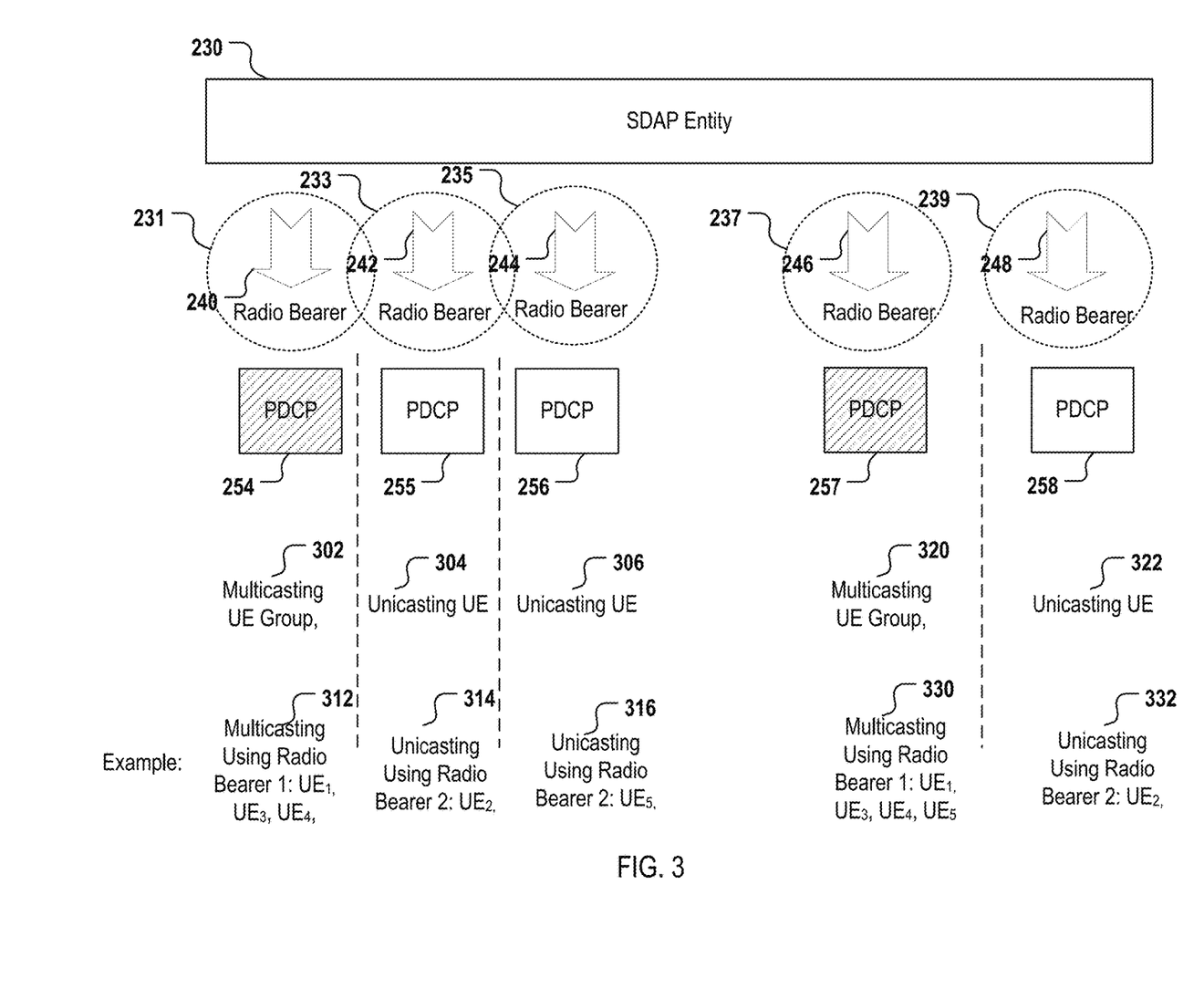
FIG. 3 shows an exemplary implementation for mapping QoS flows in a multicast/broadcast session in a wireless network to independent data radio bearers for either multicasting/broadcasting the QoS flows to a group of user equipments or unicasting the QoS flows to individual user equipments.

The exemplary implementation of FIG. 2 thus shows a mapping of one or more QoS flows onto separate data radio bearers and each separate data radio bearers may be configured either for multicast/broadcast or unicast of the one or more QoS flows to $UE_1$-$UE_N$. The multicast/broadcast or unicast above may be implemented by a wireless access network node via the air interface using the assigned/allocated data radio bearers. As further shown in FIG. 3, the multicast data radio bearer 231 and 237 may be associated with multicast/broadcast to UE groups 302 and 320, respectively, whereas the unicast data radio bearers 233, 235, and 239 may be associated with unicast to UEs 304, 306, and 332, respectively. In the particular example of FIG. 3, the multicast/broadcast session may target $UE_1$-$UE_5$. The first QoS group duplicate 240, for example, may be multicast to $UE_1$, $UE_3$, and $UE_4$ via the multicast data radio bearer 231, as shown by 312, whereas the first QoS group duplicates 242 and 244 may be unicast to $UE_2$ and $UE_5$ separately and independently via data radio bearers 233 and 235, as shown by 314 and 316. The second QoS group duplicate 246, for example, may be multicast to $UE_1$, $UE_3$, $UE_4$, and $UE_5$ via the multicast data radio bearer 237, as shown by 330, whereas the second QoS group duplicate 248 may be unicasted to $UE_2$ via data radio bearers 239, as shown by 332.

Returning to FIG. 2, the principles of the implementation above may be further understood by tracking a particular QoS flow among the QoS flows 212-218. For example, QoS flow 212 (among the first group of QoS flows including QoS flows 212, 123, 215, and 217) may be processed by the SDAP entity 230 and duplicatively mapped to independent data radio bearers 254, 255, and 256, which are respectively further processed by independent PDCP entities 254, 255, and 256. The QoS 212 may then multicast to a set of UEs targeted via the multicast PDCP entity 254, and independently unicast to a set of individual UEs via the unicast PDCP entities 255 and 256.

Continuing with FIG. 2, the number of total data radio bearers that may be allocated to the multicast/broadcast session 202, the number of multicast/broadcast radio bearers and number of unicast radio bearers, and the assignment of the various multicast/broadcast target $UE_1$-$UE_N$ to either a multicast/broadcast or unicast data radio bearer may all be dynamically and adaptively determined by the transmission network node.

In some exemplary implementations, the number of total data radio bearers that may be allocated to the multicast/multicast session 202 dynamically and adaptively according to the number of targeted UEs and the availability of radio resources. For example, the network node may first determine whether the radio resources available for carrying the data load of the multicast/broadcast session is limited. In one extreme, when the radio resources available are limited, e.g., below a predetermined threshold amount, the network node may adaptively allocate a single data radio bearer to carry, for example, all of the QoS flows 212-218 of FIG. 2 for multicast/broadcast to all target UEs. In other words, the QoS flows 212-218 would not be duplicated and a single data radio bearer and a single corresponding PDCP entity would be used to collectively handle all of the QoS flows 212-218 for multicast/broadcast. However, when the radio resources available are not limited, e.g., above the predetermined threshold amount, the SDAP entity may adaptively group and/or duplicate the QoS flows 212-218 and allocate/assign multiple data radio bearers and multiple corresponding PDCP entities to handle the duplicated and/or separately grouped QoS flows. The number of radio bearers and PDCP entities may be determined by a network node in the wireless network according to an extent to which the radio resources are available and the number of targeted UEs. In one extreme, when the transmission network node determines that the radio resources available are not limited (above a threshold value) and the number of multicast/broadcast target UEs is small, the transmission network node may allocate one unicasting data radio bearer for each target UE for each group of multiple groups of QoS flows. Any number of QoS flow groups in combination of any allocation of a combination of independent multicast/broadcast data radio bearers and independent unicast data radio bearers within each QoS group may be adaptively and dynamically implemented by the network node through the SDAP entity.

The dynamic and adaptive allocation of data radio bearers for a multicast/broadcast session may provide flexibility in radio resource utilization. For example, the multicast/broadcast session may carry multicast/broadcast QoS flow(s) with high reliability requirements. The adaptive radio bearer allocation scheme described above may provide overall improved reliability for the UEs to receive such multicast/broadcast service data. For example, when the radio resources are very limited, allocating the radio sources available as a single multicast radio bearer for all UEs may improve the ratio of UEs that would successfully receive the multicast/broadcast service data to the total number of target UEs. When there are sufficient radio resources, better overall reception of the multicast/broadcast service data by the target UEs may be achieved by allocating more unicasting data radio bearers without burdening the wireless communication system and thereby providing the UEs with more flexibility. For example, the UEs associated with a unicasting data radio bearers may be provided with an exclusive and more flexible RLC entity with automatic repeat (ARQ) functionality. Further, the UEs associated with a unicast data radio bearer may also be provided with an exclusive and more flexible MAC layer entity with hybrid automatic repeat (HARM) functionality. Further, the UEs associated with a unicast data radio bearer may also be provided with better mobility support from the network.

In some other implementations, the network node may determine the allocation of data radio bearers for carrying QoS flows in the multicast/broadcast session 202 based on geographical locations and/or surroundings of the target UEs that may affect the wireless reception of the UEs. For example, the transmission network node may determine at a particular time that the target UEs are largely distributed in several different areas of distinct wireless channel characteristics (e.g., indoor area and open outdoor area). As a result, the transmission network node may dynamically and adaptively allocate correspondingly different data radio bearers for transmitting the multicast/broadcast service data to UEs at these distinct areas. For example, the UEs located in the indoor environment may have poorer reception of wireless signals and thus would be allocated with unicast data radio bearers to improve their reception of the multicast/broadcast service data. On the other hand, the UEs located in the open areas may have higher quality reception of wireless signals and thus would be allocated with multicast/broadcast radio bearers. In this implementation, the network node may determine the locations and environmental characteristics using services from entities in other layers of the wireless communication protocol stack or applications.

In some other implementations, the network node may determine the allocation of data radio bearers for carrying QoS flows in the multicast/broadcast session 202 based on UE capabilities and limitations. The UE capabilities and limitations may include, for example number of receiving antenna and power saving requirements. Such capabilities and limitations may be disparate among the target UEs of the multicast/broadcast session. In some implementations, the network node may determine the common capabilities of the target UEs and allocate unicast radio bearers to the target UEs according to the common capabilities such that even the least capable UE will reliably receive the multicast/broadcast data. In some alternative implementations, the target UEs may be grouped according to their capabilities and limitations. Each of the capability and limitation group of UEs may be allocated a multicast or unicast (if the group only include one UE) radio bearer for independently carrying duplicated QoS flows of the multicast/broadcast session. In such implementations, each target UE within each group would be receiving the multicast/broadcast data according its capabilities and limitations.

In yet some other implementations, the network node may determine the allocation of data radio bearers for carrying QoS flows in multicast/broadcast session 202 based on UE subscription service policy considerations. These policies consideration may be related to the UEs or may be related to the subscription of UEs to the carrier network. For example, some UEs may be configured and registered as administrative UEs and thus may have higher priority over other UEs. Such priority information may be obtained by the network node from Application Function (AF) network nodes of the core network of the carrier network. Target UEs having such priority, for example, may be allocated by the transmission network node with unicast radio bearer for receiving the multicast/broadcast service data. Other Target UEs of the multicast/broadcast session may be allocated with multicast/broadcast radio bearers.

The radio resource information underlying the radio bearers allocated for either unicast or multicast/broadcast the multicast/broadcast QoS flows may be communicated to the target UEs via radio resource control signaling channels such that the UEs can configure its air interface to correctly receive either the multicast/multicast or unicast service data. In some implementations, the configuration information for all the radio bearers associated with a multicast/multicast session may be aggregated into a single radio resource allocation information and may be transmitted to the target UEs via an aggregated radio resource control message using a control signaling channel. In such implementations, a particular target UE may see all radio bearer allocation including the radio bearers that are not allocated to the particular target UE. In some other implementations, the wireless access network node may be configured only to inform a particular target UE of the radio bearers that are allocated to the particular target UE for the multicast/broadcast session. In these implementations, a particular target UE may not see allocation information for other radio bearers for the multicast/broadcast session.

In the various implementations above, a set of QoS flows of a multicast/broadcast session in a wireless network may be grouped into multiple groups of QoS flows. Each of these groups of QoS flows may be independently mapped to one or multiple data radio bearers. As such, multiple radio bearers may be allocated/assigned for transmitting the QoS flows of the multicast/broadcast service data. Each of these radio bearers may be configured by the network protocol stack to either unicast a QoS flow group to a particular target UE or multicast/broadcast the QoS flow group to a plurality of target UEs according to the requirement specified in the corresponding QoS profiles. The mapping of the QoS flows to data radio bearer may be performed by a SDAP entity. Each of the radio bearer may be associated with and further processed by an independent PDCP entity.

The description above provides various implementations for radio bearer allocation for a standalone multicast/broadcast session. Besides receiving multicast/broadcast service data, a particular target UE may also communicate with other UEs or other data networks in UE specific PDU sessions. Each of these PDU sessions is necessarily of the unicast type. In some implementations, when both a multicast/broadcast session and a PDU session for a particular UE are active, the radio bearer allocations may be nevertheless treated independently. In particular, a set of radio bearers may be allocated and assigned for supporting the multicast/broadcast session for the UE, as described above. Another independent set of radio bearers may be allocated to support the PDU session for the UE.

Figure 4:
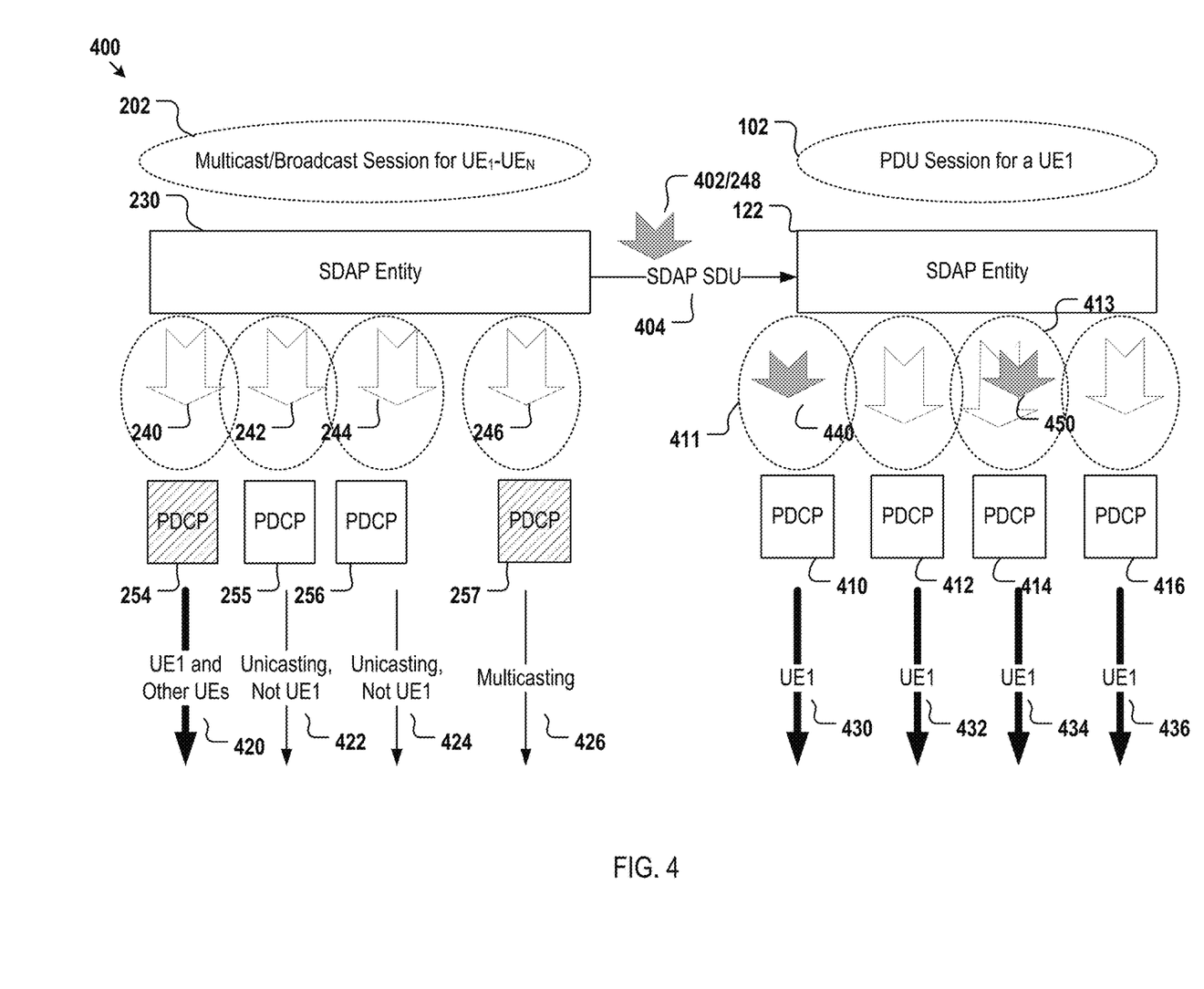
FIG. 4 shows an exemplary implementation for a collaborative assignment of data radio bearers in a wireless network for unicasting both multicast/broadcast data flows targeting a particular user equipment and other specific unicast data flows in a PDU session for the particular user equipment.
Figure 5:
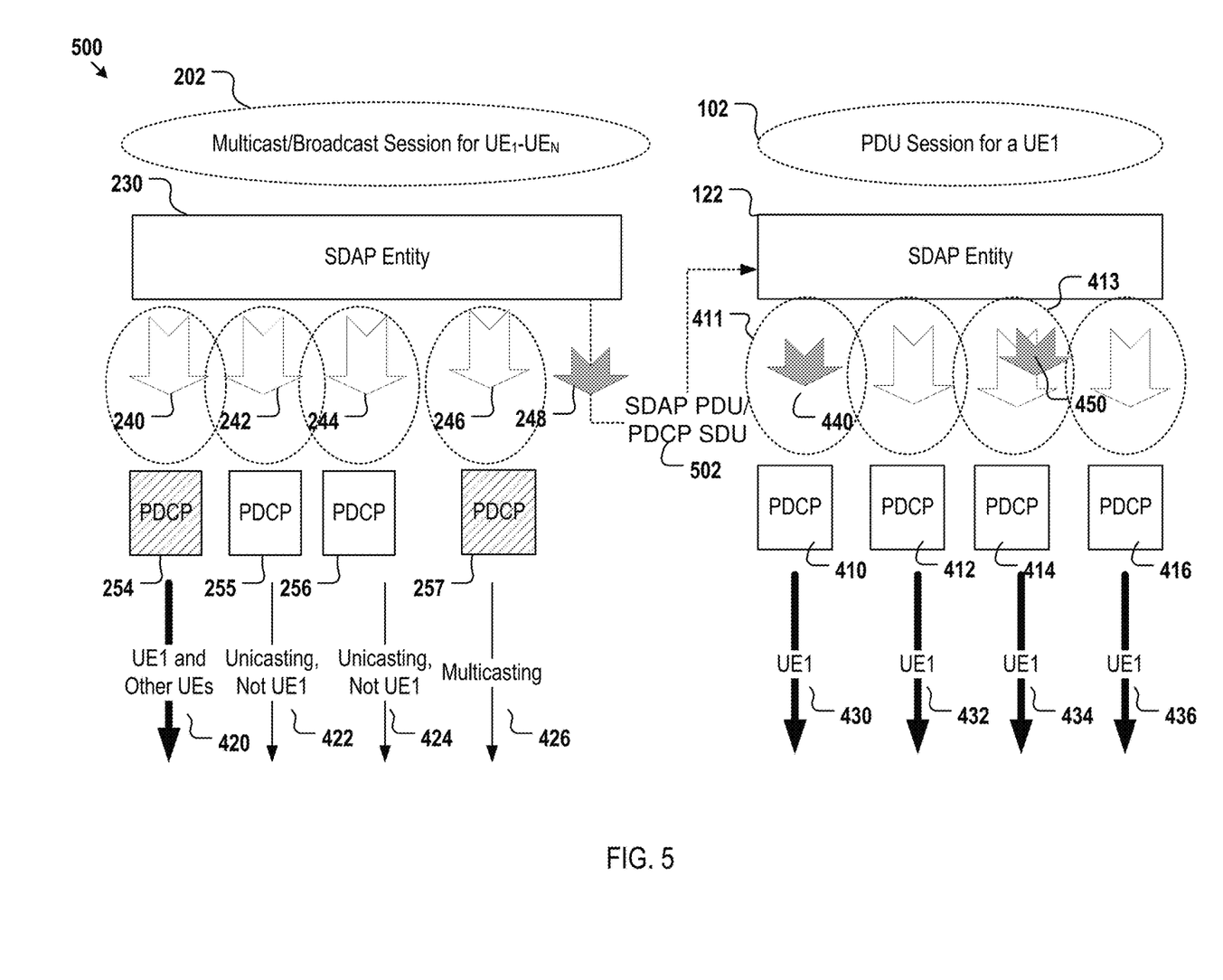
FIG. 5 shows another exemplary implementation for a collaborative assignment of data radio bearers in a wireless network for unicasting both multicast/broadcast data flows targeting a particular user equipment and other specific unicast data flows in a PDU session for the particular user equipment.

In some other implementations, as shown in FIGS. 4 and 5, the unicast radio bearer for a particular UE in a multicast/broadcast session may be jointly or collaboratively allocated and mapped with radio bearers for the particular UE in a UE-specific PDU session. The exemplary implementation 400 in FIG. 4 shows parallel multicast/broadcast session 202 and PDU session 102, each having a plurality of QoS flows (shown in FIGS. 1 and 2).

As shown in FIG. 4, the PDU session 102 is associated with SDAP entity 122. The SDAP entity 122 is responsible for mapping the unicast QoS flows of the PDU session to the allocated and assigned radio bearers. As further shown in FIG. 4, the multicast/broadcast session 202 is associated with SDAP entity 230. The multicast/broadcast QoS flows of similar characteristic are grouped and then duplicated into QoS flow groups 240, 242, 244, and 246 (here, the QoS flow groups 240, 242, and 244 are duplicates of a same group of QoS flows, and the QoS flow group 246 is another group of flows, as previously described in relation to FIG. 2), each mapped by the SDAP entity 230 to one radio bearer (see FIG. 2 above). The QoS flow groups 240, 242, 244, and 246 and the corresponding radio bearer are associated with independent PDCP entities 254, 255, 256, and 257, respectively. As an example, the PDCP entities 254 and 257 may be of multicast type whereas the PDCP entities 255 and 256 may be of unicast type. The QoS flow group 240, for example may be configured to multicast to $UE_1$ and other UEs, as shown by 420. The QoS flow group 242 and 244 may be configured to unicast to UEs other than $UE_1$, as shown by 422 and 424. The QoS flow group 246 may be configured to multicast to UEs other than $UE_1$, as shown by 426. Under the implementation of FIG. 2 having a standalone multicast/broadcast session 202, the network node may allocate two radio bearers for handling QoS flow groups 246 and 248, where the QoS flow groups 246 is to multicast/broadcast to a plurality of UEs, as indicated by 426 and described above, and the QoS flow group 248 is to unicast to $UE_1$.

In FIG. 4, with the co-existence of the unicasting PDU session 102, the allocation and mapping of the radio bearer for the multicast/broadcast QoS flow group 248 (labeled also as 402 in FIG. 4) may be jointly and collaboratively made with the radio bearer allocation for the PDU session 102.

In the implementation of FIG. 4, the service data in QoS flow group 402/248 for the multicast/broadcast session 202 may be forwarded to SDAP entity 122 in the form of an SDAP SDU for the PDU session 102 and may be mapped jointly with the other unicast QoS flows of the PDU session 102.

As illustrated by 440 and 410 in FIG. 4, some or all of the QoS flows in the unicasting QoS flow group 402/248 of the multicast/broadcast session 202 may be allocated with or mapped to a unicast radio bearer by the SDAP entity 122 and may correspond to PDCP 410 and the radio bearer 411. The Radio bearer 411 may contain only QoS flows from the QoS flow group 402/248 of the multicast/broadcast session 202. As further illustrated by 450 of FIG. 4, some or all of the QoS flows of the QoS flow group 402/248 may be mapped together with other QoS flows in the PDU session 102 to a unicast radio bearer 413 by the SDAP 122 and may be associated with PDCP entity 414. Other radio bearers associated with SDAP entity 122 in the example of FIG. 4 may be allocated and assigned to only carry unicast QoS flows of the PDU session 102, as shown by the corresponding PDCP entities 412 and 416. The PDCP 410, 412, 414, and 416 may be all of unicast type targeting $UE_1$, as shown by 430, 432, 434, and 436 of FIG. 4.

The alternative implementation 500 shown in FIG. 5 is largely similar to the implementation 400 of FIG. 4, except that the service data in QoS flow group 402/248 for the multicast/broadcast session 202 may be forwarded to SDAP entity 122 in the form of SDAP PDU rather than SDU for the PDU session 102. In some implementations, the header of SDAP PDU 502 may be removed, if there is any, and the QoS flows in the QoS flow group 248 of the multicast/broadcast session 202 may be remapped together with the QoS flows of the PDU session 102 to existing data radio bearer (413 in FIG. 5) or new data radio bearer (411 in FIG. 5). In some implementations, the SDAP PDU 502 can be directly dealt with by existing data radio bearer or new data radio bearer. In some implementations, all the radio bearers in FIGS. 4 and 5 are independently processed by the corresponding PDCPs The implementations of FIGS. 4 and 5 thus provide exemplary mechanisms for collaborative allocation and mapping of radio bearers between a multicast/broadcast session and a PDU session associated to a particular UE. Specifically, mechanisms or configurations are provided for the multicast/broadcast session to interact with a PDU session for a specific UE such that radio bearer for unicasting of a multicast/broadcast QoS flow to the specific UE may be allocated or reallocated through an SDAP entity associated with the PDU session.

In some other implementations, a UE may be notified of a first radio bearer allocated for multicasting the multicast/broadcast service data as well as a second radio bearer allocated for unicasting the multicast/broadcast service data to the UE. Such allocation might be sent from the network node through broadcast signaling or dedicated signaling to the specific receiving UE. Such signaling may include the identifier of the multicast/broadcast session identifier (ID) associated with the corresponding to the SDAP entity which is further associated with the multicast/broadcast session. Such allocation might include data radio bearer addition, modification, or release signaling. For example, and referring to FIG. 3, $UE_1$ may be notified of both multicast radio bearer 231 targeting $UE_1$ and other UEs, as well as a second radio bearer (not shown in FIG. 3) for unicasting the same duplicate QoS flows to $UE_1$. As such, $UE_1$ may choose to receive the multicast/broadcast service data either via radio bearer 231 and/or the second radio bearer. For example, $UE_1$ may first determine the quality of the wireless channels corresponding to the radio bearer 231 and the second radio bearer and configure itself to receive the multicast/broadcast service data from a channel having higher quality with smaller error rate.

In some other implementations, the multicast/broadcast session ID may not be carried in the SDAP header. In the UE, the multicast/broadcast service data carried in the unicast bearer is transferred to an upper layer, and the upper layer will determine the delivery path according to user equipments' receiving interests and the mapping between such interests and the data gram, like the IP address in the data gram. In some implementations, the upper layer may be a non-access stratum (NAS) layer.

In some other implementations, identifier of the multicast/broadcast session may be carried in the SDAP header. In the UE, the receiving SDAP entity of the multicast/broadcast service data from the radio bearer will forward the service data to the corresponding SDAP entity according to the identifier of the multicast/broadcast session, in the same path but the reversed direction from that the depicted in in FIG. 4 and FIG. 5. The SDAP entity of the multicast/broadcast session will then deliver the received multicast/broadcast service data to upper layer. In some implementations, the upper layer may be a non-access stratum (NAS) layer.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for radio bearer mapping in a wireless network, comprising:
   determining, by a data transmission network node, a data transmission flow having a predefined Quality of Service (QOS) profile containing multicast/broadcast service data to a plurality of user equipments;
   mapping, by the data transmission network node, the data transmission flow to a first radio bearer for transmitting the multicast/broadcast service data to a first set of user equipments among the plurality of user equipments;
   mapping, by the data transmission network node, the data transmission flow to a second radio bearer independent of the first radio bearer for transmitting the multicast/broadcast service data to a second set of user equipments among the plurality of user equipments; and
   configuring the data transmission network node to transmit the multicast/broadcast service data independently via the at least the first radio bearers and the second radio bearer each carrying the data transmission flow.

2. The method of claim 1, wherein:
   one set of the first set of user equipments and the second set of user equipments include a single user equipment; and
   the method comprises configuring the data transmission network node to unicast the multicast/broadcast service data to the single user equipment using one of the first radio bearer and the second radio bearer.

3. The method of claim 2, wherein the single user equipment is associated with an exclusive packet data convergence protocol (PDCP) entity of unicast type in the data transmission network node and configured to support the predefined QoS profile of the multicast/broadcast service data.

4. The method of claim 3, wherein:
   the single user equipment and the exclusive PDCP entity are associated with an exclusive radio link control (RLC) entity in the data transmission network node; and
   the exclusive PDCP entity and the exclusive RLC entity provide configuration for at least one of data transferring, header compression, ciphering, integrity protection, and error correction.

5. The method of claim 1, wherein:
   one set of the first set of user equipments and second set of user equipments include multiple user equipments; and
   the method comprises configuring the data transmission network node to multicast/broadcast the multicast/broadcast service data to the multiple user equipments using one of the first radio bearer and the second radio bearer.

6. The method of claim 5, wherein the multiple user equipments are collectively associated with a packet data convergence protocol (PDCP) entity of multicast/broadcast type and configured to support the predefined QoS profiles of the multicast/broadcast service data.

7. The method of claim 6, wherein:
   the multiple user equipments and the PDCP entity are associated with a radio link control (RLC) entity configured collectively for the multiple user equipments; and
   the PDCP entity and the RLC entity provide configuration for at least one of data transferring, header compression, ciphering, integrity protection, and error correction.

8. The method of claim 1, wherein:
   the data transmission flow having the predefined QoS profile is associated with a first service data adaptation protocol (SDAP) entity;
   the first SDAP entity is responsible for mapping the data transmission flow to the first radio bearer and the second radio bearer;
   the first radio bearer and the second radio bearer are correspondingly and exclusively associated with a first and second packet data convergence protocol (PDCP) entities; and
   the data transmission flow is duplicated with a first duplicate flow mapped to the first radio bearer and a second duplicate flow mapped to the second radio bearer.

9. The method of claim 8, wherein:
   the first radio bearer and the second radio bearer associated with the first and second PDCP entities form a radio resource allocation set; and
   the method further comprises notifying the first set of user equipments and the second set of user equipments of an entirety of the radio resource allocation set.

10. The method of claim 8, wherein:
    the first radio bearer and the second radio bearer associated with the first and second PDCP entities form a radio resource allocation set;
    the method further comprises notifying the first set of user equipments and the second set of user equipments of a portion or an entirety of the radio resource allocation set allocated to a specific set of user equipments; and the method further comprises notifying the first set of user equipments and the second set of user equipments of radio bearer addition, release and modification associated with the radio resource allocation set allocated to a specific set of user equipments.

11. The method of claim 1, wherein:
one set of the first set of user equipments and the second set of user equipments include a single user equipment;
the method comprises configuring the data transmission network node to unicast the multicast/broadcast service data to the single user equipment using one of the first radio bearer and the second radio bearer; and
the one of the first radio bearer and the second radio bearer configured for unicasting the multicast/broadcast service data to the single user equipment is further configured for transmitting another separate unicast data flow from a separate communication session specifically associated with the single user equipment.

12. The method of claim 11, wherein:
the data transmission flow having the predefined QoS profile is associated with a first service data adaptation protocol (SDAP) entity;
the another separate unicast data flow is associated with a second SDAP entity; and
a service data unit (SDU) or a protocol data unit (PDU) of the first SDAP entity containing the data transmission flow is forwarded to the second SDAP entity for indirectly allocating, via the second SDAP entity, the one of the first radio bearer and the second radio bearer.

13. The method of claim 1, wherein the first set of user equipments and the second set of user equipments are determined according to their locations having a first wireless channel quality and a second wireless channel quality;
the first wireless channel quality is higher than the second wireless channel quality;
the second set of user equipments comprises a single user equipment;
the first radio bearer is allocated for multicasting the multicast/broadcast service data to the first set of user equipments; and
the second radio bearer is allocated for unicasting the multicast/broadcast service data to the single user equipment.

14. The method of claim 13, wherein the second set of user equipments are located indoors and the first set of user equipments are located outdoors.

15. The method of claim 1, wherein:
the first set of user equipments and second set of user equipments are respectively determined according to their association with a first set of device capabilities and a second set of device capabilities different from the first set of device capabilities; and
first set of device capabilities and second set of device capabilities comprises at least one of numbers of receiving antennas or energy consumption requirements.

16. The method of claim 1, wherein:
first set of user equipments and second set of user equipments are respectively determined according to their association with a first subscription priority and a second subscription priority different from the first subscription priority;
the second subscription priority is lower than the first subscription priority;
the first set of user equipments comprises a single user equipment;

the first radio bearer is allocated and configured for unicasting the multicast/broadcast service data to the single user equipment; and
the second radio bearer is allocated and configured for multicast the multicast/broadcast service data to the second set of user equipments.

17. A method for mapping radio bearers in a wireless network, comprising:
determining a data transmission flow having predefined Quality of Service (QOS) profile containing multicast/broadcast service data to a plurality of user equipments serviced by a data transmission network node;
determining currently allocable air interface communication resources;
when the currently allocable air interface communication resources is below a threshold value, allocating a single radio bearer for multicast/broadcast of the multicast/broadcast service data to the plurality of user equipments; and
when the currently allocable air interface communication resource relative to a number of user equipments serviced by the data transmission network node is above a threshold value:
allocating at least two independent radio bearers correspondingly to at least two sets of user equipments for respectively unicasting or multicasting/broadcasting the multicast/broadcast service data to the at least two sets of user equipments;
configuring the data transmission network node to transmit the multicast/broadcast service data independently via the at least two independent radio bearers each containing the data transmission flow.

18. A method performed by a user equipment, comprising:
receiving a first resource allocation from a data transmission network node containing an operation of addition/release/modification of a unicast radio bearer wherein the unicast radio bearer is allocated to the user equipment and is not shared by other user equipments;
receiving a second resource allocation from the data transmission network node containing an operation of addition/release/modification of a multicast/broadcast radio bearer;
configuring the unicast radio bearer and the multicast/broadcast radio bearer in the user equipment according to the first resource allocation and the second resource allocation; and
requesting one or more lower layers to receive multicast/broadcast service data of a multicast/broadcast session from the data transmission network node targeting a plurality of user equipments via the unicast radio bearer or the multicast/broadcast radio bearer or both.

19. The method of claim 18, further comprising configuring a first SDAP entity associated with a specific communication session associated with the user equipment and a second SDAP entity with the multicast/broadcast session, wherein the multicast/broadcast service data received by a PDCP entity associated with the first SDAP entity is forwarded by the first SDAP entity to the second SDAP entity according to an identifier in the received multicast/broadcast service data.

20. One or more network devices or a user equipment comprising one or more processors and one or more memories, wherein the one or more processors are configured to read computer code from the one or more memories to:
determine a data transmission flow having a predefined Quality of Service (QOS) profile containing multicast/broadcast service data to a plurality of user equipments;

map the data transmission flow to a first radio bearer for transmitting the multicast/broadcast service data to a first set of user equipments among the plurality of user equipments;

map the data transmission flow to a second radio bearer independent of the first radio bearer for transmitting the multicast/broadcast service data to a second set of user equipments among the plurality of user equipments; and configure the one or more network devices or a user equipment to transmit the multicast/broadcast service data independently via the at least the first radio bearers and the second radio bearer each carrying the data transmission flow.

* * * * *